United States Patent
Xiao et al.

(10) Patent No.: US 6,452,126 B1
(45) Date of Patent: Sep. 17, 2002

(54) ELECTROSTATIC SEPARATION ENHANCED BY MEDIA ADDITION

(75) Inventors: Chuanfu Xiao, Richmond; Laurence Allen, III, San Rafael, both of CA (US)

(73) Assignee: MBA Polymers, Inc., Richmond, CA (US)

( * ) Notice: Subject to any disclaimer, the term of this patent is extended or adjusted under 35 U.S.C. 154(b) by 0 days.

(21) Appl. No.: 09/469,596

(22) Filed: Dec. 22, 1999

Related U.S. Application Data (60) Provisional application No. 60/123,926, filed on Mar. 12, 1999.

(51) Int. Cl.[7] .................................................. B03C 7/00
(52) U.S. Cl. ................................ 209/127.1; 209/127.3; 209/128; 209/130; 209/131
(58) Field of Search ........................... 209/128, 127.3, 209/127.4, 127.1, 130, 131

(56) References Cited

U.S. PATENT DOCUMENTS

| | | |
|---|---|---|
| 3,888,678 A | 6/1975 | Bailey, Jr. et al. |
| 4,326,951 A | 4/1982 | Broz |
| 4,363,723 A | 12/1982 | Knoll et al. |
| 4,514,289 A | 4/1985 | Inculet |
| 4,517,078 A | 5/1985 | Inculet et al. |
| 4,557,827 A | 12/1985 | Fricke et al. |
| 4,570,861 A | 2/1986 | Zentgraf et al. |
| 4,797,201 A | 1/1989 | Küppers et al. |
| 5,118,407 A * | 6/1992 | Beck et al. ................. 209/2 |
| 5,251,762 A | 10/1993 | Taylor et al. |
| 5,289,922 A | 3/1994 | Inculet et al. |
| 5,358,119 A | 10/1994 | Stahl et al. |
| 5,366,091 A | 11/1994 | Stahl et al. |
| 5,502,118 A | 3/1996 | Macholdt et al. |
| 5,888,274 A | 3/1999 | Frederick |
| 5,944,875 A * | 8/1999 | Stencel et al. ........... 209/127.1 |
| 6,011,229 A | 1/2000 | Geisler |
| 6,034,342 A * | 3/2000 | Schmoutziguer et al. 209/127.1 |
| 6,271,492 B1 * | 8/2001 | Machata et al. ......... 209/127.1 |

FOREIGN PATENT DOCUMENTS

| | | | | |
|---|---|---|---|---|
| WO | WO93/06934 | * | 4/1993 | .............. 209/127.1 |
| WO | 93/06934 | * | 4/1993 | |
| WO | WO 98/28080 | | 7/1998 | |
| WO | WO 00/29119 | | 5/2000 | |

OTHER PUBLICATIONS

Brandrup et al., *Recycling and Recovery of Plastics*, 1996, Hanser/Gardner Publications, Inc., Cincinnati.
Chang et al., *Handbook of Electrostatic Processes*, 1995, Marcel Dekker, Inc.
Higashiyama et al., *J. Electrostatics*, 1993, 30:203–212.
Ku et al., *Electrical Properties of Polymers*, 1987, Hanser Publishers.
Ralston, *Electrostatic Separation of Mixed Granular Solids*, 1961, Elsevier Publishing Company.
Taylor et al., *Industrial Electrostatics: fundamentals and measurements*, 1994, Research Studies Press LTD.
Weiss, *SME Mineral Processing Handbook*, 1985, American Institute of Mining, Metallurgical, and Petroleum Engineers, Inc.

\* cited by examiner

*Primary Examiner*—Donald P. Walsh
*Assistant Examiner*—Jonathan R Miller
(74) *Attorney, Agent, or Firm*—Fish & Richardson P.C.

(57) ABSTRACT

This invention relates to improving the separation efficiency in a triboelectric separator by adding media against which the components of the mixture will charge. As a result, random charging between the components of the mixture is reduced and controlled, and predictable charging is achieved.

59 Claims, 9 Drawing Sheets

(b) An improved separation of a binary mixture with media addition

Fig. 1 An Overview of a Waste Polymer Separation Plant

Figure 5. Charging Sequence

Figure 6 Side View A of the Overall Process

Figure 6A Side View B of the Overall Process

Figure 7 Flowchart of Separation Media Addition and Recovery to Improve Electrostatic Separation – Option 1

Figure 8. Flowchart of Separation Media Addition and Recovery to Improve Electrostatic Separation – Option 2

Figure 9 Separation of ABS, HIPS, PC, PP and PVC without Media Addition

Figure 10 Separation of ABS, HIPS, PC, PP and PVC with ABS Media Addition

Figure 11 Separation of ABS, HIPS, PC, PP and PVC with PC Media Addition

Figure 12 Separation of ABS, HIPS, PC, PP and PVC with PP Media Addition

ELECTROSTATIC SEPARATION ENHANCED BY MEDIA ADDITION

CROSS REFERENCE TO RELATED APPLICATIONS

This application claims priority from provisional patent application Ser. No. jc541 U.S. PTO 60/123,926, filed Mar. 12, 1999, the entire contents of which are hereby incorporated by reference.

FIELD OF THE INVENTION

This invention relates to electrostatic separation and triboelectric charging.

BACKGROUND OF THE INVENTION

The goal of durable goods plastics recycling is to separate the various types of plastic in a waste stream so that the plastics can be reused. This task is daunting because of the complexity of waste feed stocks, which typically have waste products as diverse as electronic goods, automotive parts, and consumer products, such as containers. The variety of plastics include polycarbonate (PC), polypropylene (PP), polystyrene (PS), acetylene-butadiene-styrene (ABS), high-impact polystyrene (HIPS), polyvinyl chloride (PVC), polyamide (PA), high-density polyethylene (HDPE), low-density polyethylene (LDPE), linear low-density polyethylene (LLDPE), polyurethane (PUR), polyesters, polyphenylene oxide (PPO) and polybutylene terephthalate (PBT) and others. In addition, the products can include various grades of these polymers and the blends of polymers such as PC/ABS, PVC/ABS and others.

One technique that has been suggested for separating plastic waste streams is electrostatic separation. In this technique, the plastic particles in the waste stream are charged and passed through high voltage electric fields where they are differentially deflected based on the polarity of the charge or the magnitude of the charge. One method for charging the materials is triboelectric charging. Triboelectric charging occurs when two dissimilar materials are allowed to rub together and electrons are transferred from one material to another. The direction of electron transfer and the magnitude of the relative voltage can be obtained by rubbing materials together and measuring the electrostatic voltages.

Triboelectrostatic separation has gained some successful applications in separating waste plastics from beverage bottles, PVC from PET, and packaging plastics, PE from PP. The separation efficiency can dramatically decrease when processing mixtures consisting of more than two materials, or when the relative composition of the two components is not constant.

SUMMARY OF THE INVENTION

This invention relates to improving the separation efficiency in a triboelectric separator by adding media against which the components of the mixture will charge. As a result, random charging between the components of the mixture is reduced and controlled, and predictable charging is achieved.

In general, the invention features a method of triboelectric treatment of a mixture that includes charging the mixture with a media. The media may contain a single or multiple components. It is selected in accordance with the electrostatic charging sequence of the components in the mixture, and the expected products from the mixture. The charging sequence is generally described in Chen C. Ku and Raimond Liepins, *Electrical Properties of Polymers* (1987).

Preferred embodiments may include one or more of the following features. The media component may be composed of a material, e.g., a polymer material, that is substantially the same as a component in the mixture. Alternatively, the media component may be substantially composed of material that is dissimilar from the components of the mixture. The terms "same" and "dissimilar" refer, for example, to chemical composition, grade, etc. The media component may be provided in an amount that is at least about 50% of the mixture by volume or mass, or in an amount that is less than 50% of the mixture by volume or mass. For example, the amount of media component may be at least about 3 times the mass or volume of the mixture. The particle size of the media may be selected such that it is the same as, or substantially different from, the particle size of the components of the mixture. The position on the charging sequence of the media may be the same as, or different from, the components of the mixture.

The media may be combined with the mixture to effect charging and then separated from the mixture after charging. Suitable separation processes include dry processes (e.g., air classification, screening, and combinations thereof) and wet processes (e.g., gravity concentration, froth floatation, and combinations thereof). Separation of the media from the mixture may occur either before or after the media has passed through an electric field. The separated media may be recycled, e.g., in a continuous loop.

The mixture may be a two component mixture or a multi-component mixture, e.g., having three or more components. The mixture may contain polymeric, mineral, agricultural or other components. An example of a suitable mixture is a durable products waste stream such as granulated electrical component waste stream.

Embodiments of the invention may also include one or more of the following advantages. The media can completely control the triboelectric charging of the mixture. Any component in the mixture could charge against the media, while charging between components of the mixture is negligible. Therefore, the variation in component percentages would not significantly affect the charging or the separation. In other words, any material, whatever its percentage in the composition, would charge against the media to the same extent. In this way, random charging is minimized, and improved separation is achieved by controlled charging. Highly complex polymer mixtures that do not include a primary component that dominates the mixture can be effectively separated. The technique would minimize the requirement to adjust splitter position in an electrostatic separator to accommodate changes in feed composition. The technique may enable a ternary separation that generates three products simultaneously in one pass, so as to reduce the number of separation steps required to produce multiple products. The technique is adaptable to waste streams in which the component concentrations in the mixture vary over time. The media is generally non-polluting and can be recycled in a continuous stream.

Further aspects, features and advantages follow.

DETAILED DESCRIPTION

Figure 1:
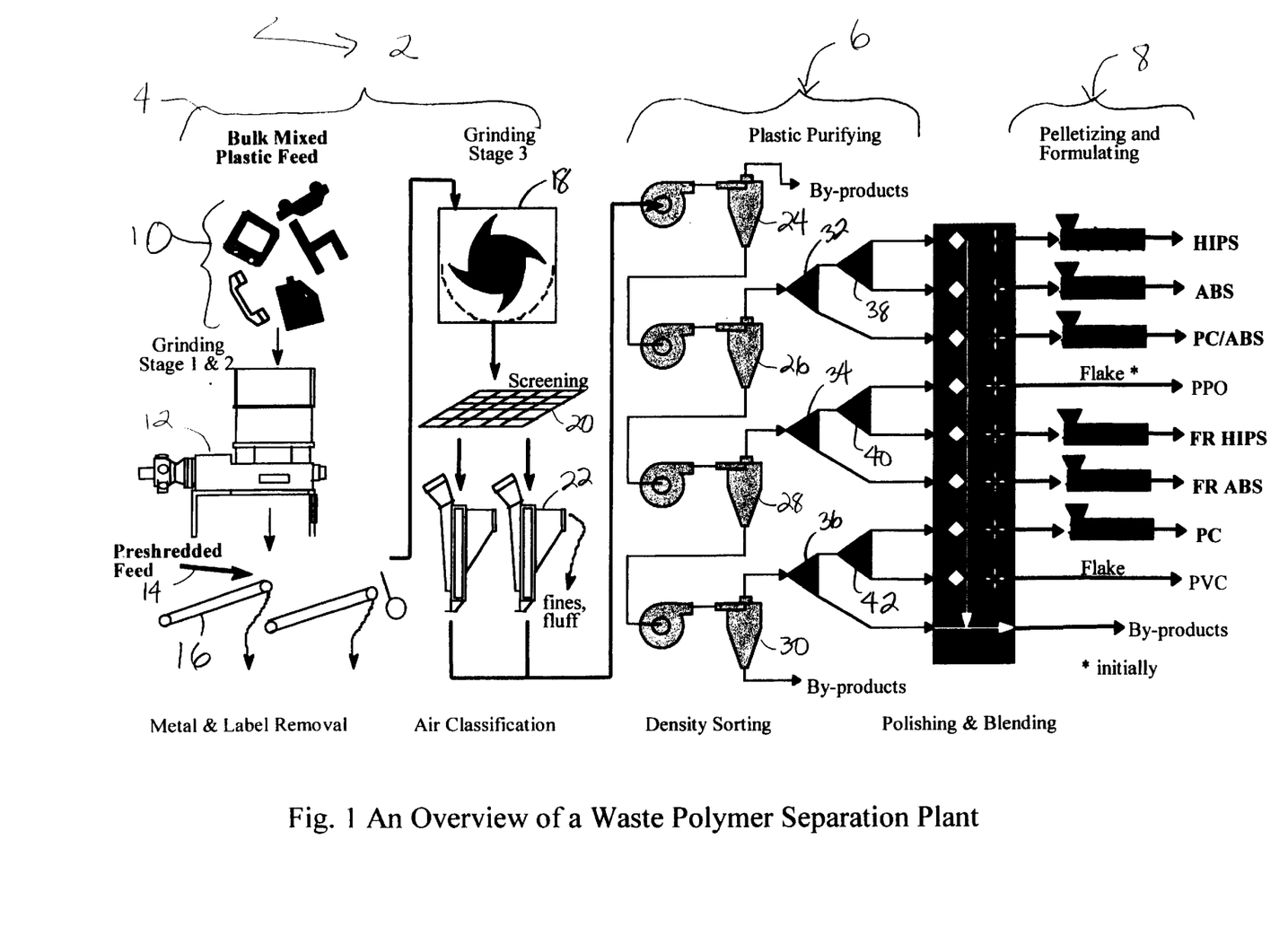
FIG. 1 is an overview of a waste polymer separation plant.

Referring to FIG. 1, a plastics recycling plant 2 includes bulk waste treatment stage 4, a plastics purifying stage 6, and a pelletizing and formulation stage 8. In the bulk treatment stage 4, bulk durable goods waste 10, which may include, for example, computer components, auto part components, furniture, telecommunications components, and containers, is first subject to a grinding apparatus 12, e.g. a shredder, to reduce the waste to a shredded material feed 14. The shredded material feed is then treated by a magnetic separator 16 to remove ferrous metals. The resulting feed is then ground by a granulator 18, and separated by a screen 20, which is followed by air classifiers 22 that produce a mixed plastic feed with a particle size in the range of about 0.01 to 0.5 inch suitable for treatment in the plastic purification stage 6.

The goal of the plastic purification stage is to separate the feed stock mixture into substantially pure plastic components or predetermined plastic mixtures. The purification stage includes a series of gravity concentrators 24–30 which provide a rough separation based on material density. An example of a suitable separator is a hydrocyclone.

The output of these separators is then fed to a series of first stage electrostatic separators 32–36, which provide separation of some components, while leaving others in mixture form. These mixtures may then be treated in further stage separators 38–42. The resulting separated components are then individually blended, for uniformity, and pelletized in stage 8.

Figure 2:
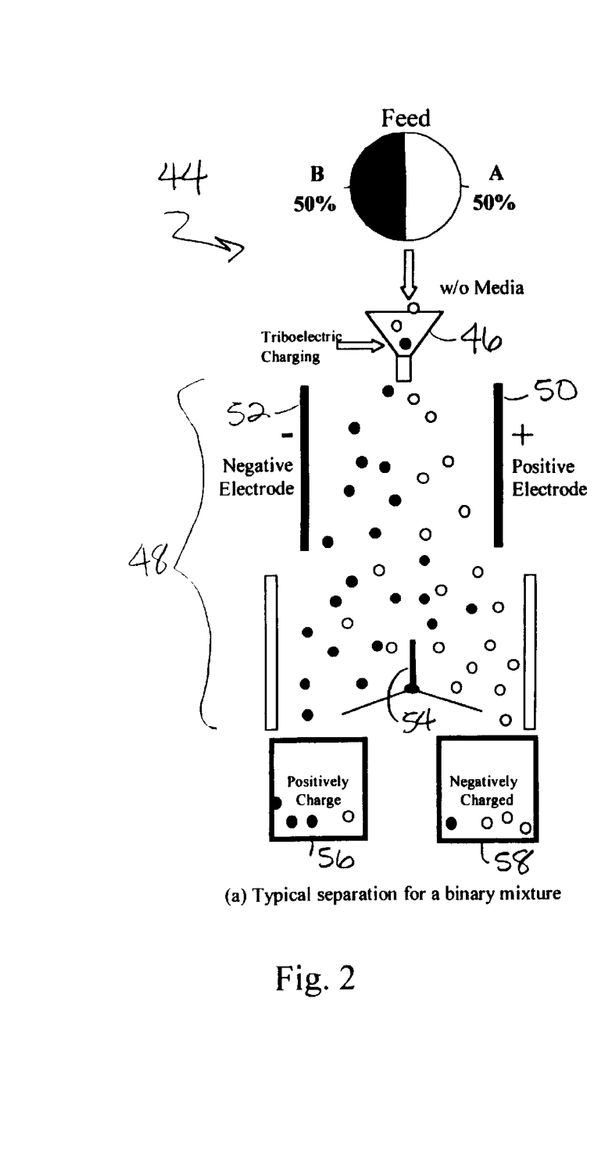
FIG. 2 illustrates triboelectric separation of a two component mixture without media addition.

Referring to FIG. 2, the general operation of a triboelectric separator in the separation of a two component mixture is illustrated. The separator 44 includes a charging region 46, in which polymer flakes are contacted with each other to induce electron transfer. The flakes are then distributed into an electrostatic separation region 48 which includes positive and negative electrodes 50, 52. As the flakes fall by gravity through the separation region, the positively charged flakes deflect toward the negative electrode and the negatively charged flakes deflect toward the positive electrode. At the end of the separation region, a baffle 54 is arranged to deflect the original particle stream into different collection containers 56, 58. The baffle is sized and positioned to separate the polymers based on the predicted charge differential characteristics. The separation is binary in that it splits a single stream into two component streams. A Middling fraction is sometimes recirculated to the same separator to improve purity or yield, or to a later stage separator.

Because the charging step relies on random contact between the particles, the magnitude of the charge transfer among particles varies and there is a possibility that substantial numbers of particles will not charge or will neutralize. These phenomena can result in a inefficient separation. For example, neutralized flakes may be distributed in either bin. This problem becomes more acute as the composition of the waste feed stock changes over time since the separator operating parameters optimized for a given mixture may not produce an effective separation for a different mixture. Moreover, the charging possibilities become significantly more complex with mixtures having more than two components.

Figure 3:
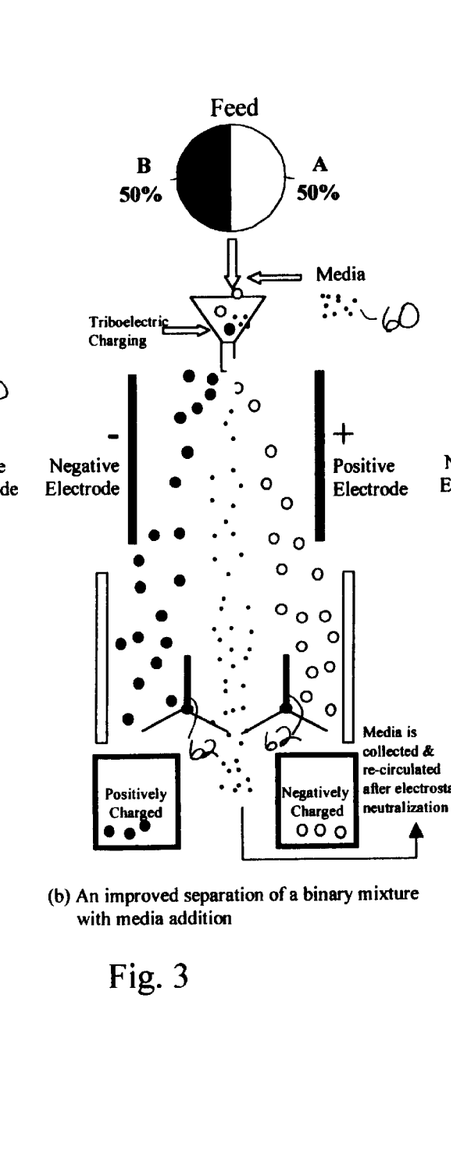
FIG. 3 illustrates triboelectric separation of a two component mixture with media addition.

Referring to FIG. 3, the predictability and efficiency of the separation is enhanced by the addition of a triboelectric media that has a known charging sequence position. The media 60 is used to charge both components of the mixture. As a result, the two components are effectively separated. The majority of the media, in this example, remains neutral. A baffle system 62 includes two baffles which separate the positively and negatively charged particles into separate bins. In addition, the media can be collected, and then be recirculated.

Figure 4:
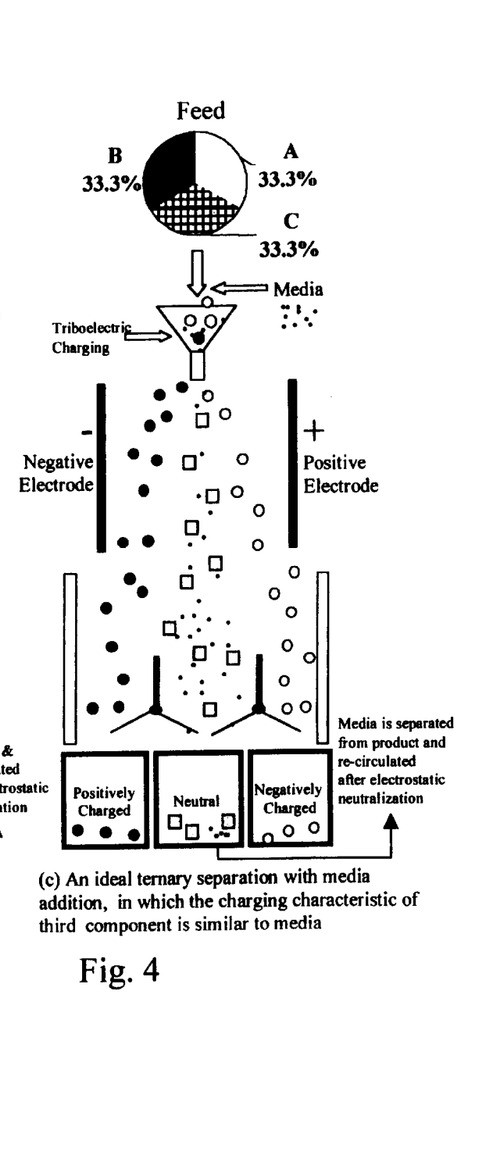
FIG. 4 illustrates triboelectric separation of a three component mixture with media addition.

Referring to FIG. 4, the separation of a three component mixture is illustrated. For the case of a three component mixture without media addition, the resultant charging of each plastic would be dictated by contact directly preceding entry into the electric field. If, for example, plastic A, B, and C (supplied in equal amounts) were mixed together and had a charging sequence, A, C, and B from more negatively charged to more positively charged, material C could either be positive if it contacted A, or negative if it contacted B, prior to entry into the electric field. In a media addition separation, this can be avoided. For example, if media were added with a charging property equal to C, which dominated the particle-particle contacts, it would ensure that A and B attained a charging potential relative only to C. This would promote a ternary separation.

Figure 5:
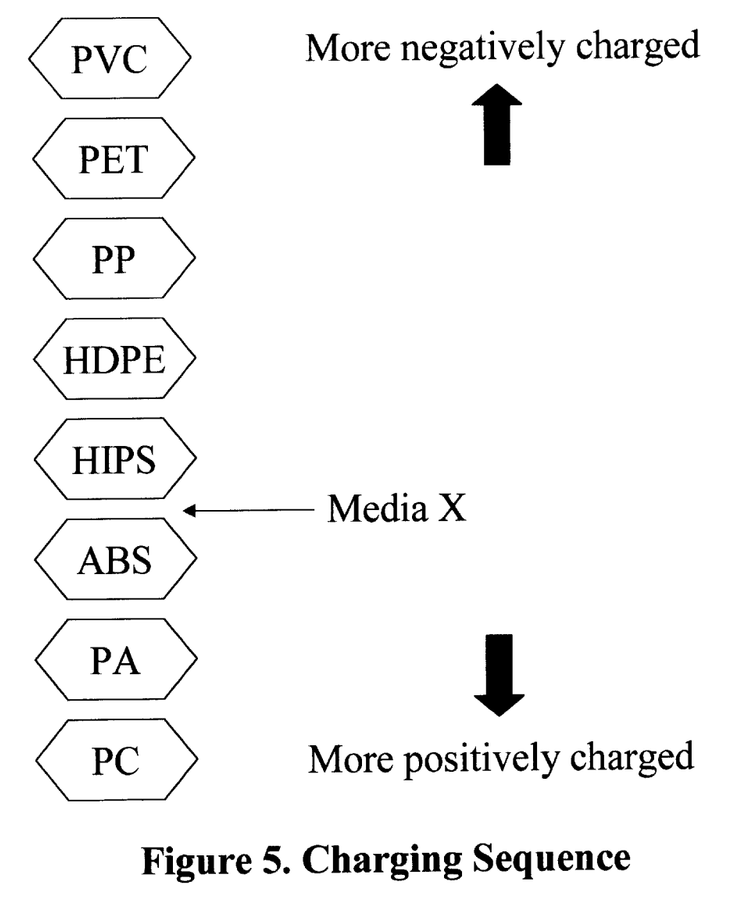
FIG. 5 illustrates the charging sequence of certain plastics.

Referring to FIG. 5, a triboelectric series for polymers common to waste streams is illustrated. For a mixture including these components, and a media with a position in the charging sequence between HIPS and ABS, plastics with a charging sequence position lower than the position of the media would provide electrons to the media. The media would transfer electrons to plastics with a charging sequence position higher than the media. If the media dominated the other plastics on a surface area basis, the media would experience an insignificant change in electrostatic voltage, whereas the other materials would attain high voltages. Electrostatic separation of the materials with a charging sequence position lower than the media from the plastics with a charging sequence position higher than the media would thus be possible. If a three component feed were used, the media could be selected to have the very same charging property as the intermediate component. In this case, the media would be neutral with respect to the intermediate component, but charge the other components to opposite charges. This would provide the potential for a ternary separation and a total of three products.

In some cases, it may be possible to select a polymer as the media which is similar or identical to one of the components in the mixture to be separated. For example, if the objective was to recover PA and PC from the other components in the table, PA media should be added in quantities sufficient to enable PC to report to the negative electrode, the PA would fall to the center since it would be neutral, and the PVC, PET, PP, HDPE, HIPS and ABS would report to the positive electrode. The remaining components could sequentially be separated by using HIPS, PP, and PVC medias. Hence, an eight component mixture would be separated using only four separators.

While the media may be used to effect subtle changes in the charging characteristics, typically, the media controls the charging by charge domination. In this case, the amount of media is typically provided at least 50% by mass of the waste mixture, more typically 3 to 5 times the mass of the waste mixture, so that all components of the mixture charge against the media. Typically, the large mass of the media provides the greatest charging surface area. This substantial mass of media is beneficial when for example the media is coarser in size than the mixture to be separated. For example, the media is preferably sized about ⅜ inch and the waste stream flake size is about 5/16 inch.

In some other embodiments the media may be either finer in particle size or thinner than the mixture and it is sufficient to use a smaller mass of media. Smaller or thinner media particles have a higher surface to volume ratio at a given geometry and it is satisfactory to use less than 50% media by mass of the mixture. Since, in terms of nonconductors, charging is a function of surface area rather than mass, a smaller quantity of media would generally be required to retain the same amount of charge if the media had a smaller particle size. Media surface area and thus the required amount of media can be controlled by media particle size, shape or the ratio of mixture particle size to media particle size.

Figure 6:
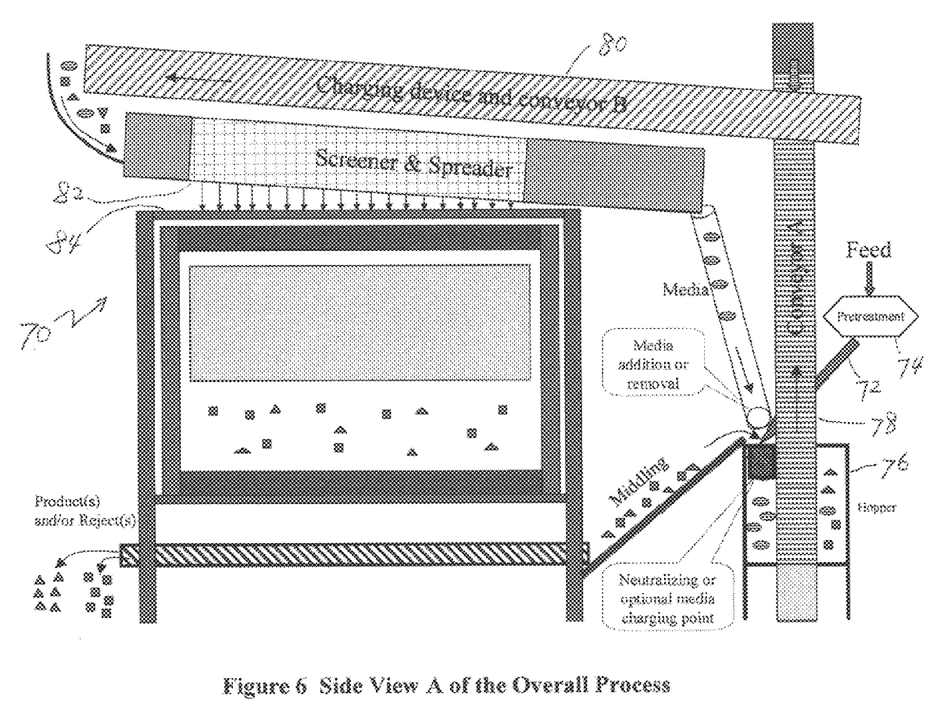
FIG. 6 is a side view schematic of a triboelectric separation unit including provisions for media recycling.
Figure 6A:
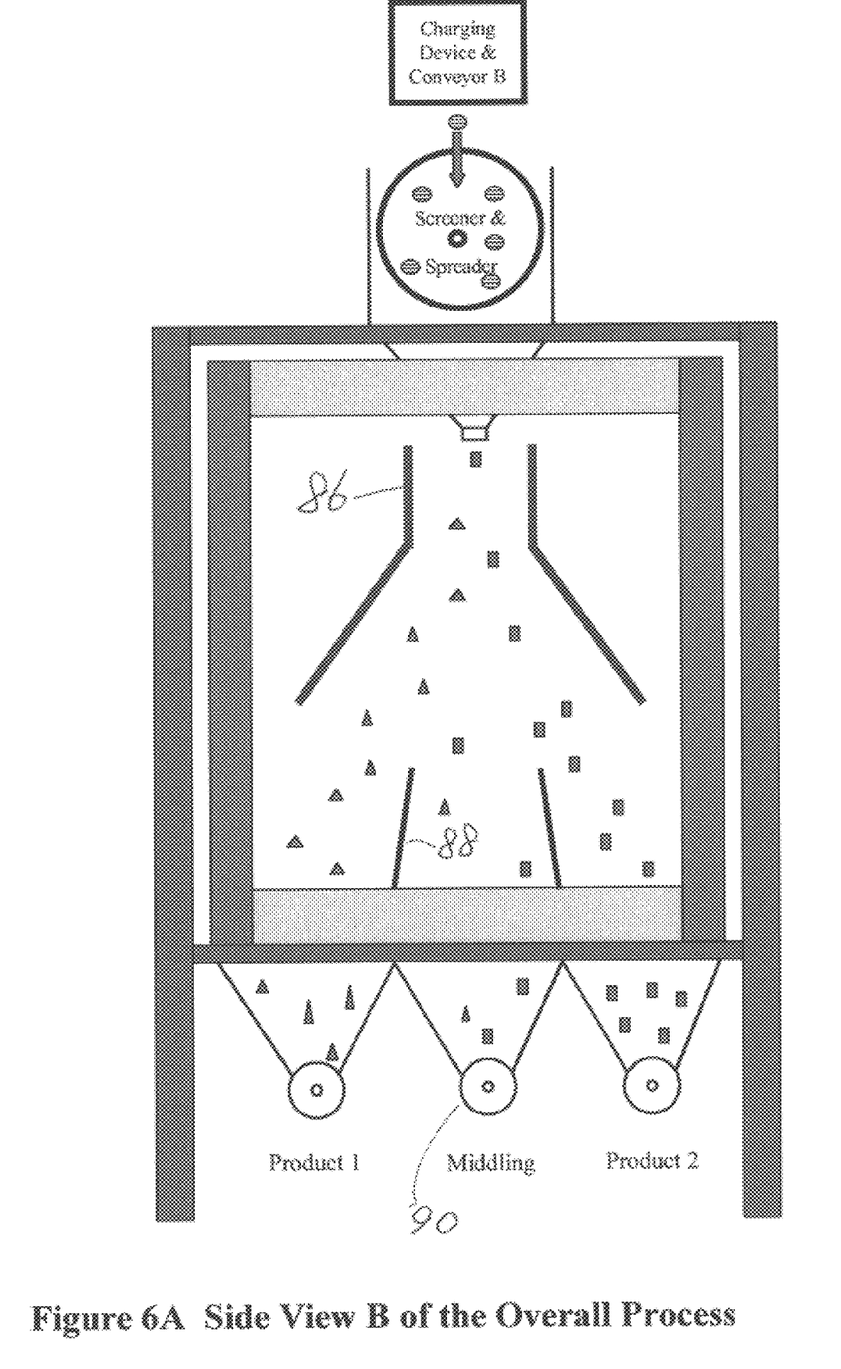
FIG. 6a is a front view of the apparatus in FIG. 6.

Referring to FIGS. 6 and 6A, a continuously operating mediated triboelectric separation unit 70 includes an inlet 72 which receives a polymer flake mixture to be separated. The feed is optionally treated in a pretreatment unit 74 which may be a drying unit such as a heated conveyor.

After pretreatment, the flakes are deposited into a hopper 76 which also includes the media. A conveyor 78 takes the media and the flakes to a charging/conveyor device 80, such as a variable speed mixer auger with cut and folded flight (available from SCC Industries of Visalia, Calif.). The flakes and media are thoroughly contacted in the auger so that charge differentials are generated based on triboelectric charging. The speed of the auger can be controlled to vary the residence time and degree of mixing.

The charged mixture is then provided to a screener spreader 82, e.g. a trommel. The trommel removes the media by size differentiation. Typically, the media is sized larger than a ⅜ inch through hole screen aperture. The trommel also spreads the flakes across the opening of a separation stage 84. Finally, the trommel enhances charging efficiency as the flakes interact with the media just prior to introduction to the separation unit.

Referring to FIG. 6A, the separation unit includes electrodes 86 and baffles 88 to produce a ternary separation. The unit is about 15 feet high, by 9 feet long by about 7 feet wide. The electrodes operate at about 50 KV or more, e.g. 100–125 KV. Conveyors 90 collect the products. These conveyors may be, for example, screw augers, which may turn in one direction to discharge all three products, or alternatively one conveyor may turn in an opposite direction to recirculate middlings or deposit one product at another end of the separator. The middle product may represent incompletely separated flakes in a one or two component feed, and can be recycled by deposition in the hopper. The recycled fraction and the media are optionally neutralized by an electrostatic neutralizer (e.g., an Aerostat Phoenix extended range ionizing air blower available from SIMCO) and recirculated. In mixtures of three or more components, one or more of the products is typically separated in a further stage.

Figure 7:
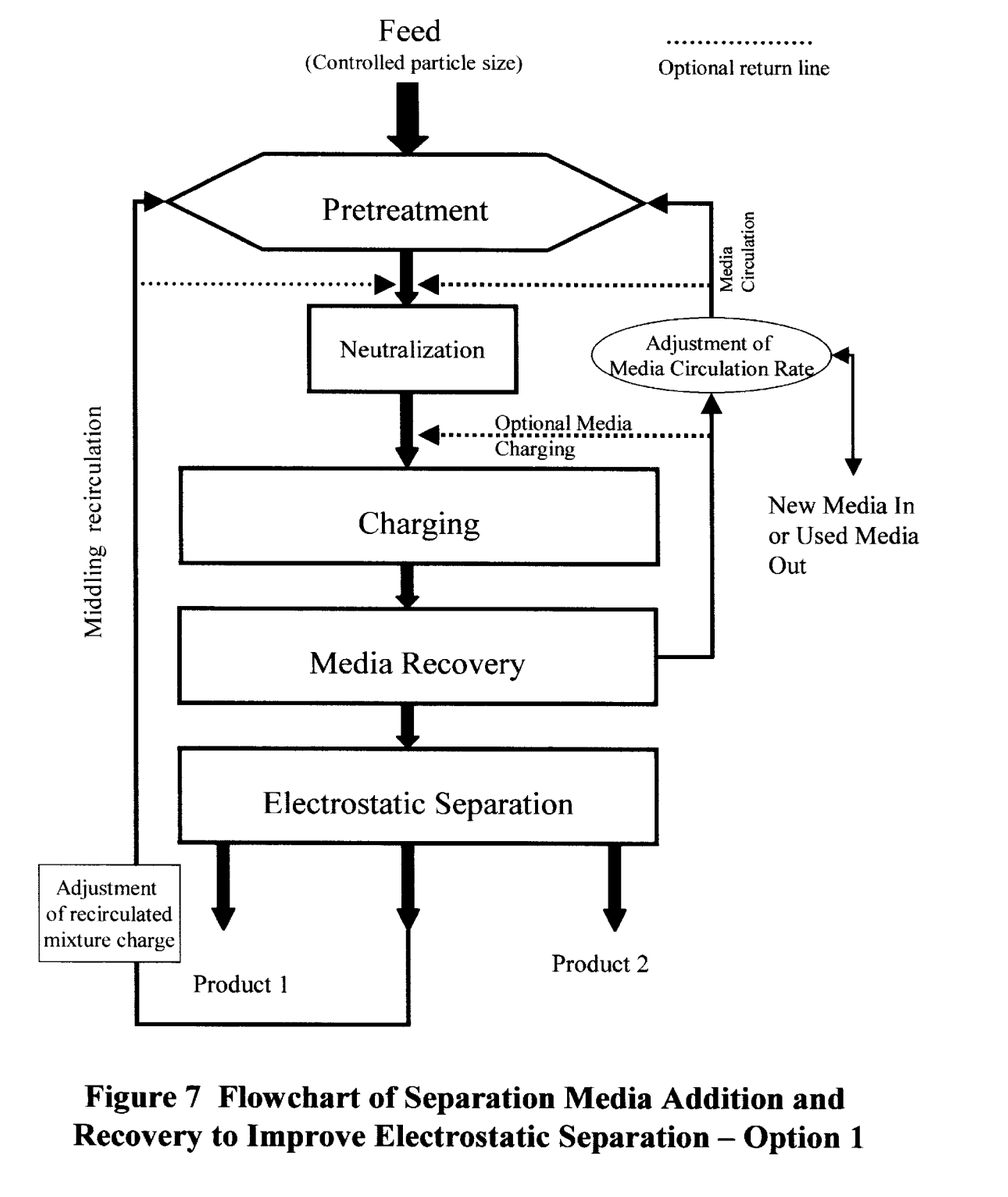
FIG. 7 is a flow chart of a separation process with media addition.

Referring to FIG. 7, a flow diagram illustrates operation of the apparatus shown in FIGS. 6 and 6a. As shown in FIG. 7, the media may be recirculated to either a pretreatment stage or to a stage between pretreatment and neutralization. The middle fraction can also be a product or be re-circulated to a pretreatment stage or to a stage between pretreatment and neutralization. Recirculating middling products would be done in cases where only a binary separator was desired. Alternately more than three products can be removed from the bottom of the unit, in this case, one or more may be recirculated and two or more may be separated products.

Figure 8:
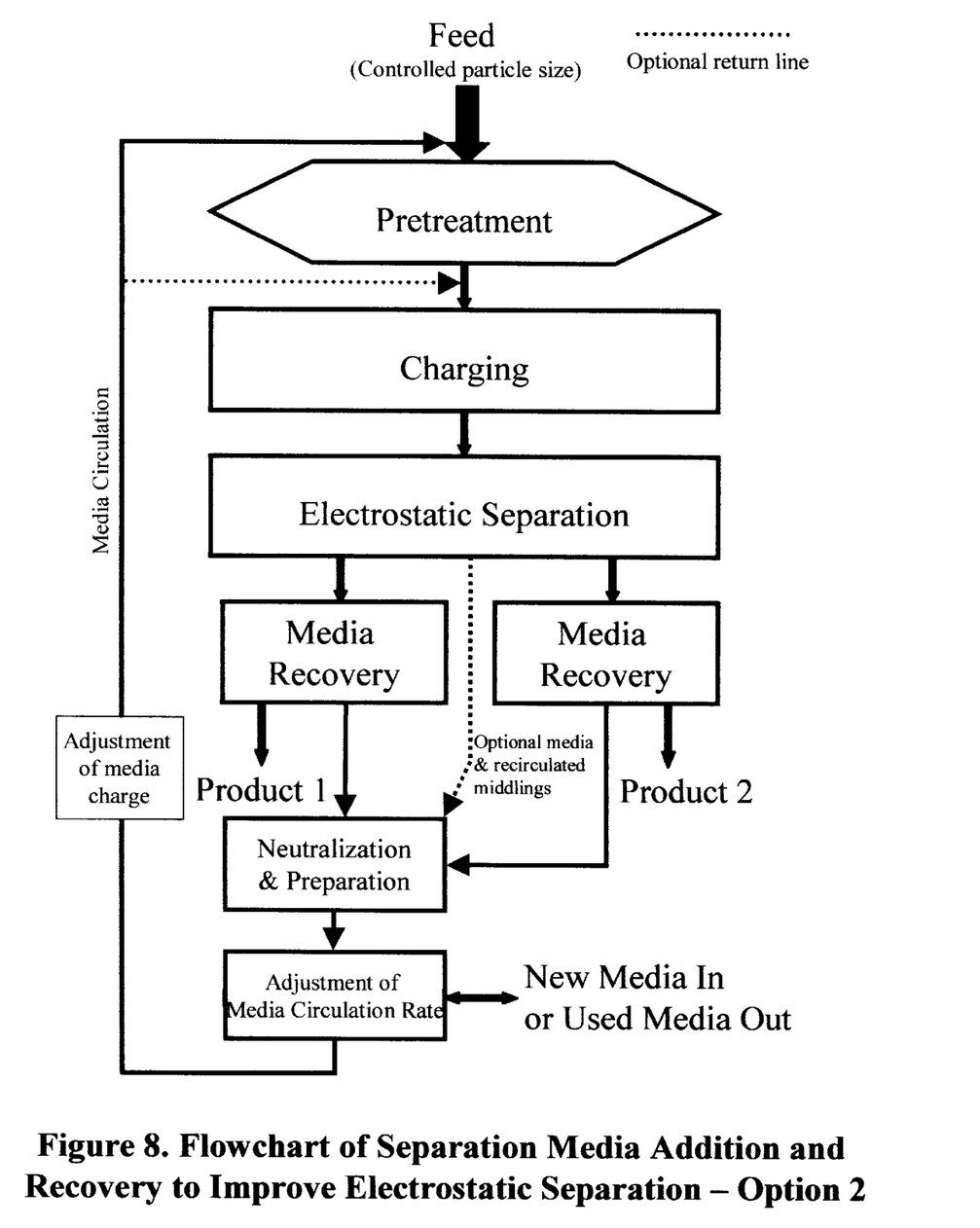
FIG. 8 is a flow chart of an alternate separation process with media addition.

Referring to FIG. 8, in an alternate operational embodiment the media may be separated after passing through the separation stage. Separation of the media from products afterwards might reduce the throughput of the separator. On the other hand, it also might be helpful for target materials to retain charges in separation fields. In addition, it may simplify the systems setup.

Referring to FIG. 7 and FIG. 8, the middling may be optionally recirculated. Such recirculation could meaningfully increase the product purity with a reduction of separator's throughout. Moreover, the middling may be recirculated with the separation media as shown in FIG. 7. In this case, the media to middling mass ratio should be adjusted to retain the effect of separation media and to perform a controlled separation.

The invention will now be described further by way of the following examples.

EXAMPLES

Example 1

This example describes separating PMMA from a mixture of PMMA, ABS, and HIPS with the aid of ABS media.

A mixture having equal parts PMMA, ABS, and Flame Retardant HIPS ("FR HIPS") was prepared. The size of the particles in the mixture ranged from 1.59 mm to 4.06 mm ABS identical to the ABS in the mixture except having a particle size ranging from 5.08 mm to 9.53 mm was used as the separation media. The amount of media was varied in the test. The separation was conducted using an electric field strength of 400 kV/m and humidity of 35%±2%. The mixture was charged with the ABS media for about 2.5 minutes. The mixture was then distributed using a spreader to allow the mixture to pass through the electric field evenly along the electrode.

The charging sequence of the individual components of the mixture was determined in a separate experiment by rubbing the materials on one another and then measuring their electrostatic voltage and polarity immediately after the rubbing. The results demonstrated that FR HIPS was the most negatively charged and thus would be expected to report towards the positive electrode. PMMA was the most positively charged and thus would be expected to report towards the negative electrode. The ABS in the mixture would be expected to report towards the center of the unit with a nearly neutral charge.

The results of the separation performed using the PMMA, ABS, and FR HIPS mixture, set forth in Table 1, confirmed this observation and demonstrated the utility of including ABS separation media. As shown in Table 1, in the absence of ABS media, PMMA purity at the negative electrode side was only 49.01%, with the remainder being ABS. However, when ABS media in an amount equal to 100% of the mixture mass was combined with and charged with the mixture, 85.41% PMMA purity at the negative electrode was obtained in one pass, with the remainder of the mixture being driven towards the positive electrode. Higher purity, (98.15%), was obtained when ABS media was added in an amount equal to 200% of the mixture mass.

TABLE 1

| Media Amount (% of total mixture mass) | PMMA Purity |
|---|---|
| 0 | 49.01% |
| 100 | 85.41% |
| 200 | 98.15% |

Example 2

This example describes separating PVC from a mixture of ABS, PC, and PVC with the aid of HIPS media.

A mixture having equal parts ABS, PC, and PVC was prepared. The size of the particles in the mixture ranged from 2.36 mm to 4.75 mm. An amount of HIPS equal to 400% of the mixture mass and having a particle size ranging from 8 mm to 12.7 mm was used as the separation media. The separation was conducted using an electric field strength of 506 kV/m and humidity of 35%±2%. The mixture was charged up with HIPS media for about 10 minutes and then passed through the electric field. Products were collected in a chamber under the electric field and between the two electrodes. The chamber was split into 10 equally sized compartments. From the negative electrode to the positive electrode, the compartments were numbered from 1 to 10. Product from each compartment was collected, weighed, and identified.

The results of the separation are set forth in Table 2. For the sake of convenience, the material from compartments 8 to 10 was combined. As shown in Table 2, after adding HIPS media, the PVC purity in the last three compartments increased from 95.81% to 99.74%, and the recovery increased from 87.45% to 96.29%.

TABLE 2

| Separation Results | Without Media | With HIPS Media |
|---|---|---|
| PVC purity, % | 95.81 | 99.74 |
| PVC recovery, % | 87.45 | 96.29 |

Example 3

The procedure of Example 2 was repeated except the mixture consisted of HIPS, PC, and PVC, and the separation media was ABS. The results are shown in Table 3. They demonstrate that using ABS as a separation media significantly increases the purity of the recovered PVC with only a slight decrease in PVC recovery.

TABLE 3

| Separation Results | Without Media | With ABS Media |
|---|---|---|
| PVC purity, % | 48.99 | 91.32 |
| PVC recovery, % | 95.48 | 93.76 |

Example 4

The procedure of Example 2 was repeated except the mixture consisted of ABS, HIPS, and PVC, and the separation media was PC. The results are shown in Table 4. They demonstrate that using PC as a separation media significantly increases the purity of the recovered PVC with a slight increase in PVC recovery.

TABLE 4

| Separation Results | Without Media | With PC Media |
|---|---|---|
| PVC purity, % | 48.61 | 99.76 |
| PVC recovery, % | 92.25 | 92.53 |

Example 5

The procedure of Example 2 was repeated except the mixture consisted of 45% HIPS, 45% PC, and 10% PVC, and the separation media was HIPS. The contents of the middle split (compartments 4–7) were analyzed. The results are shown in Table 5. They demonstrate that using HIPS as a separation media significantly increases the amount of HIPS recovered in the middle compartments (4–7) with a moderate decrease in HIPS purity.

TABLE 5

| Separation Results | Without Media | With HIPS Media |
|---|---|---|
| HIPS purity, % | 95.28 | 88.61 |
| HIPS recovery, % | 39.57 | 88.75 |

Example 6

The procedure of Example 5 was followed except that the mixture consisted of 45% ABS, 45% HIPS, and 10% PVC. In addition, the % recovery and % purity were determined for each component of the mixture. ABS was recovered in compartments 1–3 nearest the negative electrode, HIPS was recovered in compartments 4–7, and PVC was recovered in compartments 8–10 nearest the positive electrode. The results are shown in Table 6. The results demonstrate that by using HIPS media, overall purity increased for each component of the mixture. In addition, with the exception of ABS recovery, the amount of recovered material increased.

TABLE 6

| Separation Results | Without Media | With HIPS Media |
|---|---|---|
| ABS purity, % | 60.12 | 94.47 |
| ABS recovery, % | 88.80 | 78.57 |
| HIPS purity, % | 71.43 | 81.48 |
| HIPS recovery, % | 44.78 | 94.70 |
| PVC purity, % | 97.25 | 97.89 |
| PVC recovery, % | 89.88 | 94.90 |

Example 7

Figure 9:
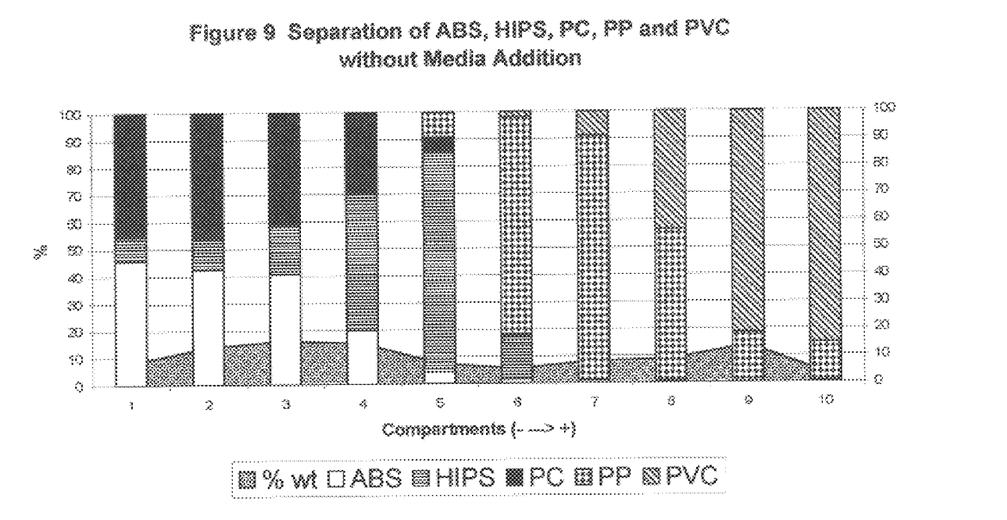
FIG. 9 illustrates the separation results for a mixture containing ABS, HIPS, PC, PP, and PVC without media addition.

The procedure of Example 2 was followed except that the mixture consisted of equal amounts of ABS, HIPS, PC, PP, and PVC. The particle size of the mixture ranged from 2.36 mm to 4.75 mm. Initially, separation was performed without the addition of media. The results are shown in FIG. 9. Three additional separations were then performed, each using a different media. The amount of media in each case was equal to 400% of the mass of the mixture. The particle size of the media in each case ranged from 8 mm to 12.7 mm.

Figure 10:
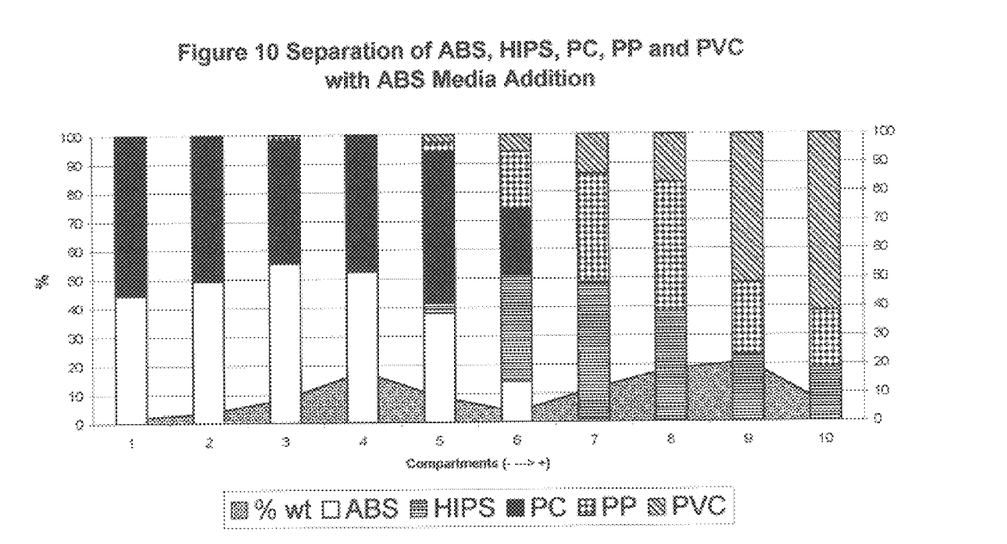
FIG. 10 illustrates the separation results for a mixture containing ABS, HIPS, PC, PP, and PVC with the addition of ABS media.

FIG. 10 illustrates the results of a separation performed using ABS media. Comparison of FIGS. 9 and 10 reveals that unlike the separation performed without media, in the separation employing ABS media, HIPS fully reported toward the positive electrode, while only ABS and PC reported toward the negative electrode. Accordingly, inclusion of ABS media significantly simplifies second stage separation when ABS and PC are the desirable products.

Figure 11:
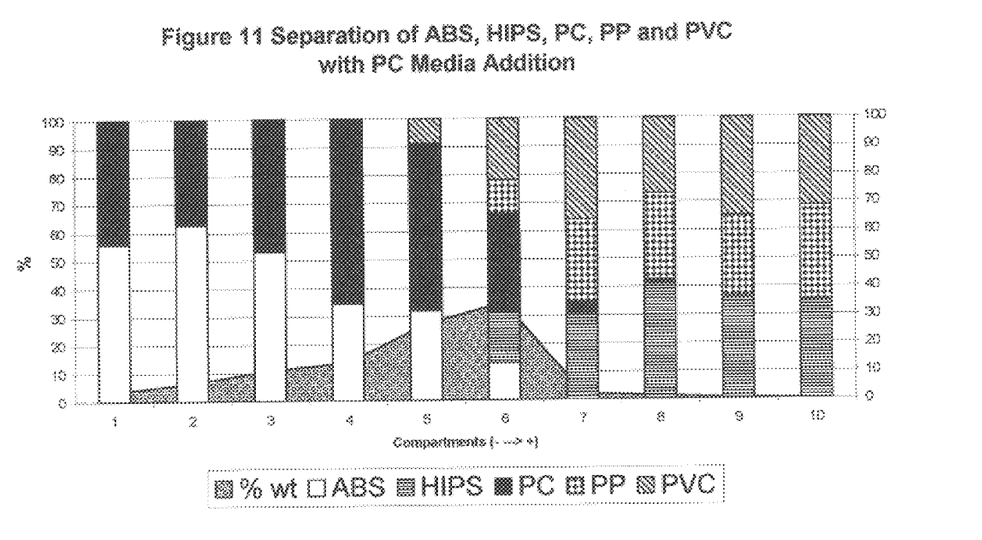
FIG. 11 illustrates the separation results for a mixture containing ABS, HIPS, PC, PP, and PVC with the addition of PC media.

FIG. 11 illustrates the results of a separation performed using PC media. Comparison of FIGS. 9 and 11 reveals that unlike the separation performed without media, in the separation employing PC media, HIPS was driven toward the positive electrode, whereas ABS and PC reported toward the negative electrode. These results demonstrate that if PC is not the major component in the mixture, ABS near the negative electrode can be collected as a final product after one pass.

Figure 12:
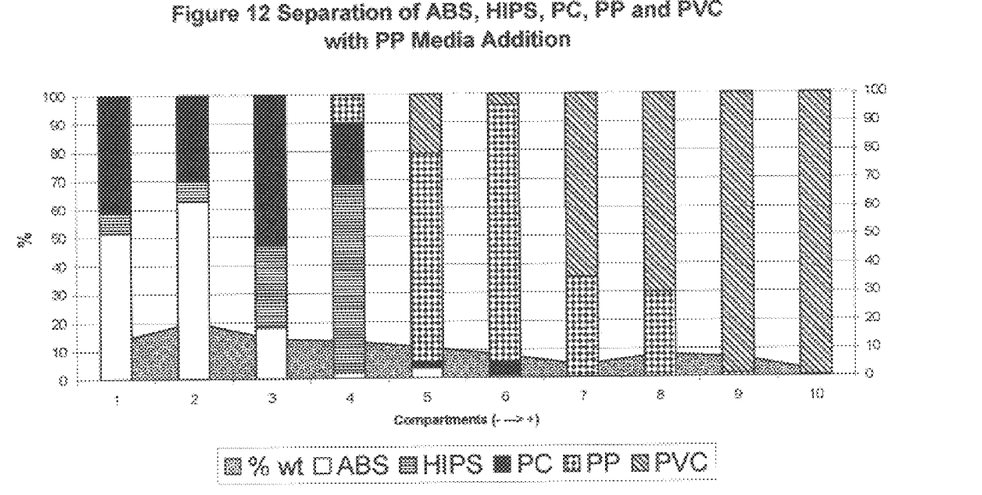
FIG. 12 illustrates the separation results for a mixture containing ABS, HIPS, PC, PP, and PVC with the addition of PP media.

FIG. 12 illustrates the results of a separation performed using PP media. Comparison of FIGS. 9 and 12 reveals that unlike the separation performed without media, in the separation employing PP media, PP tends to drop into the middle compartment, while PVC of 99% or greater purity is produced in the compartment near the positive electrode. Thus, the final PVC product may be obtained after only one pass. FIG. 12 also demonstrates that PP tends to concentrate in the middle compartments (nos. 5 and 6). Accordingly, it is possible to perform a ternary separation.

Further embodiments are in the following claims.

What is claimed is:

1. A method for separation of polymeric components, the method comprising
   providing a mixture including polymeric components;
   adding to the mixture a particulate media having a selected position within an electrostatic charging sequence, the media having a chemical composition different from the chemical compositions of individual components in the mixture; and
   triboelectrically charging the mixture with the media.

2. The method of claim 1 wherein the media is provided in an amount of at least about 50% of the mixture by volume or mass.

3. The method of claim 1 wherein the media is provided in an amount less than 50% of the mixture by volume or mass.

4. The method of claim 1 wherein the media is provided in an amount of at least about 3 times the volume or mass of the mixture.

5. The method of claim 1 wherein the media has a particle size substantially different from the particle size of the mixture.

6. The method of claim 1 comprising separating the media from the mixture after charging.

7. The method of claim 6 comprising recycling the separated media.

8. The method of claim 7 comprising recycling the separated media in a continuous feed loop.

9. The method of claim 6 wherein the media is separated from the mixture using a dry process.

10. The method of claim 9 wherein said dry process is selected from the group consisting of air classification, screening, electrostatic separation and combinations thereof.

11. The method of claim 10 wherein separation of the media from mixture is by screening.

12. The method of claim 6 wherein the media is separated from the mixture using a wet process.

13. The method of claim 12 wherein said wet process is selected from the group consisting of gravity concentration, froth floatation, and combinations thereof.

14. The method of claim 6 wherein the media is separated from the mixture before passing through an electric field.

15. The method of claim 6 wherein the media is separated from the mixture after passing through an electric field.

16. The method of claim 1 wherein the media is substantially a dissimilar material from the components of the mixture.

17. The method of claim 1 or 16 wherein the mixture is a two component mixture.

18. The method of claim 1 or 16 wherein the mixture has three or more components.

19. The method of claim 1 wherein the mixture is a durable products waste stream.

20. The method of claim 1 wherein the position of the media in the charging sequence is different from the position of the components of the mixture in the charging sequence.

21. The method of claim 1 wherein the particle size of the media is the same as the particle size of the mixture.

22. The method of claim 1 wherein the media has a charge that is adjusted such that it is positive with respect to a ground state prior to being added to the mixture.

23. The method of claim 1 wherein the media has a charge that is adjusted such that it is negative with respect to a ground state prior to being added to the mixture.

24. The method of claim 1 wherein the media is at ground state prior to being added to the mixture.

25. The method of claim 1 wherein the mixture is a polymer mixture.

26. The method of claim 1, further comprising electrostatically separating the mixture into three or more components.

27. The method of claim 1, wherein the mixture comprises polystyrene and acetylene-butadiene-styrene.

28. The method of claim 1, wherein the media comprises polycarbonate and the mixture comprises acetylene-butadiene-styrene and polystyrene.

29. A method for separation of polymeric components, the method comprising
   providing a mixture including polymeric components;
   adding to the mixture a particulate media having a selected position within a charging sequence, wherein the media has a charge that is adjusted such that it is positive with respect to a ground state prior to being added to the mixture;
   triboelectrically charging the mixture with the media;
   separating the media from the mixture after charging; and
   recycling the separated media.

30. A method for separation of polymeric components, the method comprising
   providing a mixture including polymeric components;
   adding to the mixture a particulate media having a selected position within a charging sequence, wherein the media has a charge that is adjusted such that it is negative with respect to a ground state prior to being added to the mixture;
   triboelectrically charging the mixture with the media;
   separating the media from the mixture after charging; and
   recycling the separated media.

31. The method of any one of claims 29 or 30 wherein the media is substantially the same as a component of the mixture.

32. The method of any one of claims 27, 29, or 30 wherein the media is provided in an amount of at least about 50% of the mixture by volume or mass.

33. The method of any one of claims 27, 29, or 30 wherein the media is provided in an amount less than 50% of the mixture by volume or mass.

34. The method of any one of claims 27, 29, or 30 wherein the media is provided in an amount of at least about 3 times the volume or mass of the mixture.

35. The method of any one of claims 27, 29, or 30 wherein the media has a particle size substantially different from the particle size of the mixture.

36. The method of claim 27 comprising separating the media from the mixture after charging.

37. The method of claim 36 comprising recycling the separated media.

38. The method of claim 37 comprising recycling the separated media in a continuous feed loop.

39. The method of claim 36 wherein the media is separated from the mixture using a dry process.

40. The method of claim 39 wherein said dry process is selected from the group consisting of air classification, screening, electrostatic separation and combinations thereof.

41. The method of claim 40 wherein separation of the media from mixture is by screening.

42. The method of claim 36 wherein the media is separated from the mixture using a wet process.

43. The method of claim 42 wherein said wet process is selected from the group consisting of gravity concentration, froth floatation, and combinations thereof.

44. The method of claim 36 wherein the media is separated from the mixture before passing through an electric field.

45. The method of claim 36 wherein the media is separated from the mixture after passing through an electric field.

46. The method of any one of claims 29 or 30 wherein the media is substantially a dissimilar material from the components of the mixture.

47. The method of any one of claims 27, 29, or 30 wherein the mixture is a two component mixture.

48. The method of any one of claims 27, 29, or 30 wherein the mixture has three or more components.

49. The method of any one of claims 27, 29, or 30 wherein the mixture is a durable products waste stream.

50. The method of any one of claims 29 or 30 wherein the position of the media in the charging sequence is the same as the position of a component of the mixture in the charging sequence.

51. The method of any one of claims 27, 29, or 30 wherein the position of the media in the charging sequence is different from the position of the components of the mixture in the charging sequence.

52. The method of any one of claims 27, 29, or 30 wherein the particle size of the media is the same as the particle size of the mixture.

53. The method of any one of claims 27, 29, or 30 comprising triboelectric charging the mixture with a media having selected position in a charging sequence followed by electrostatically separating the mixture.

54. The method of any one of claims 29 or 30, wherein the mixture comprises polystyrene and acetylene-butadiene-styrene.

55. The method of any one of claims 1, 29, or 30 wherein the media has a grade different than a grade of a component in the mixture.

56. The method of claim 27 wherein the media has a charge that is adjusted such that it is positive with respect to a ground state prior to being added to the mixture.

57. The method of claim 27 wherein the media has a charge that is adjusted such that it is negative with respect to a ground state prior to being added to the mixture.

58. The method of claim 27 wherein the media is at ground state prior to being added to the mixture.

59. The method of claim 27 wherein the mixture is a polymer mixture.

* * * * *